(12) United States Patent
Crawford

(10) Patent No.: US 8,347,373 B2
(45) Date of Patent: *Jan. 1, 2013

(54) CONTENT FILTERING OF REMOTE FILE-SYSTEM ACCESS PROTOCOLS

(75) Inventor: William Jeffrey Crawford, Coquitlam (CA)

(73) Assignee: Fortinet, Inc., Sunnyvale, CA (US)

( * ) Notice: Subject to any disclaimer, the term of this patent is extended or adjusted under 35 U.S.C. 154(b) by 1267 days.

This patent is subject to a terminal disclaimer.

(21) Appl. No.: 11/746,046

(22) Filed: May 8, 2007

(65) Prior Publication Data

US 2008/0282337 A1 Nov. 13, 2008

(51) Int. Cl.
*G06F 17/00* (2006.01)
*G06F 15/16* (2006.01)

(52) U.S. Cl. .............................. 726/12; 726/14; 726/22
(58) Field of Classification Search .................... 726/12, 726/24

See application file for complete search history.

(56) References Cited

U.S. PATENT DOCUMENTS

| | | | | |
|---|---|---|---|---|
| 6,453,354 | B1 * | 9/2002 | Jiang et al. ................ | 709/229 |
| 6,957,219 | B1 * | 10/2005 | Lin et al. .................... | 1/1 |
| 2002/0178381 | A1 * | 11/2002 | Lee et al. ................... | 713/201 |
| 2003/0110391 | A1 * | 6/2003 | Wolff et al. ................ | 713/200 |
| 2003/0145228 | A1 * | 7/2003 | Suuronen et al. .......... | 713/201 |
| 2004/0268017 | A1 * | 12/2004 | Uzrad-Nali et al. ....... | 711/1 |
| 2009/0006423 | A1 | 1/2009 | Crawford | |

OTHER PUBLICATIONS

Non-Final Office Action for U.S. Appl. No. 12/202,427 mailed Sep. 30, 2010.
Non-Final Rejection for U.S. Appl. No. 12/202,427 mailed Jul. 20, 2012.
Final Rejection for U.S. Appl. No. 12/202,427 mailed Feb. 3, 2012.
Non-Final Rejection for U.S. Appl. No. 12/202,427 mailed Jun. 9, 2011.
Final Rejection for U.S. Appl. No. 12/202,427 mailed Mar. 18, 2011.
Firewall-1. The Industry's Most Proven Perimeter Security. Check Point Software Technologies Ltd. 4 pgs., May 12, 2005.

* cited by examiner

*Primary Examiner* — Brandon Hoffman
*Assistant Examiner* — Samuel Ambaye
(74) *Attorney, Agent, or Firm* — Hamilton, DeSanctis & Cha LLP

(57) ABSTRACT

Methods and systems for content filtering of remote file-system access protocols are provided. According to one embodiment, a transparent proxy running within a network gateway logically interposed between a client and a server intercepts remote file-system access protocol requests/responses. Responsive to receipt of a remote file-system access protocol request from the client, the network gateway issues the remote file-system access protocol request to the server on behalf of the client. The network gateway buffers into a holding buffer associated with the network gateway data being read from or written to a file associated with a share of the server. Then, responsive to a predetermined event in relation to the remote file-system access protocol or the holding buffer, the network gateway determines the existence or non-existence of malicious, dangerous or unauthorized content contained within the holding buffer by performing content filtering on the holding buffer.

52 Claims, 8 Drawing Sheets

CONTENT FILTERING OF REMOTE FILE-SYSTEM ACCESS PROTOCOLS

CROSS-REFERENCE TO RELATED APPLICATIONS

This application may relate to subject matter disclosed in U.S. application Ser. No. 11/283,891 filed on Nov. 22, 2005 and U.S. application Ser. No. 11/331,030 filed Jan. 13, 2006, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2006-2007, Fortinet, Inc.

BACKGROUND

1. Field

Embodiments of the present invention generally relate to computer security and computer network security. In particular, embodiments of the present invention relate to content filtering of remote file-system access protocol streams.

2. Description of the Related Art

Various remote file-system access protocols provide client applications with the ability to read and write to files on and to request services from server programs in a computer network. For example, the Server Message Block (SMB) protocol can be used over the Internet on top of the TCP/IP protocol or on top of other network protocols, such as Internetwork Packet Exchange (IPX) and NetBEUI, to access files at a remote server as well as other resources, including printers, mailslots, and named pipes. Thus, a client application can read, create, and update files on the remote server. It can also communicate with any server program that is set up to receive an SMB client request.

Common Internet File System (CIFS) defines a standard remote file-system access protocol for use over the Internet, enabling groups of users to work together and share documents across the Internet or within corporate intranets. CIFS is an open, cross-platform technology based on the native file-sharing protocols built into Microsoft® Windows® and other popular Personal Computer (PC) operating systems, and supported on dozens of other platforms.

Unfortunately, the use of such remote file-system access protocols introduces insecurities as (i) the complexities of these protocols have made it difficult to perform content filtering, such as malware scanning, on the files when transferred through a network gateway; (ii) most network equipment vendors have chosen to simply provide access control functionality to their gateways to control read and write access to files and/or specific shared resources while leaving any complex filtering to be performed on the server; and (iii) users sharing folders or other resources from their personal desktop machines may not have appropriate filtering applications (e.g., antivirus software) installed, and therefore malicious programs can potential spread to or from such shared folders or resources.

SUMMARY

Methods and systems are described for content filtering of remote file-system access protocols. According to one embodiment, a proxy running within a network gateway logically interposed between a client and a server intercepts remote file-system access protocol requests/responses. Responsive to receipt of a remote file-system access protocol request from the client, the network gateway issues the remote file-system access protocol request to the server on behalf of the client. The network gateway buffers into a holding buffer associated with the network gateway data being read from or written to a file associated with a share of the server. Then, responsive to a predetermined event in relation to the remote file-system access protocol or the holding buffer, the network gateway determines the existence or nonexistence of malicious, dangerous or unauthorized content contained within the holding buffer by performing content filtering on the holding buffer.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
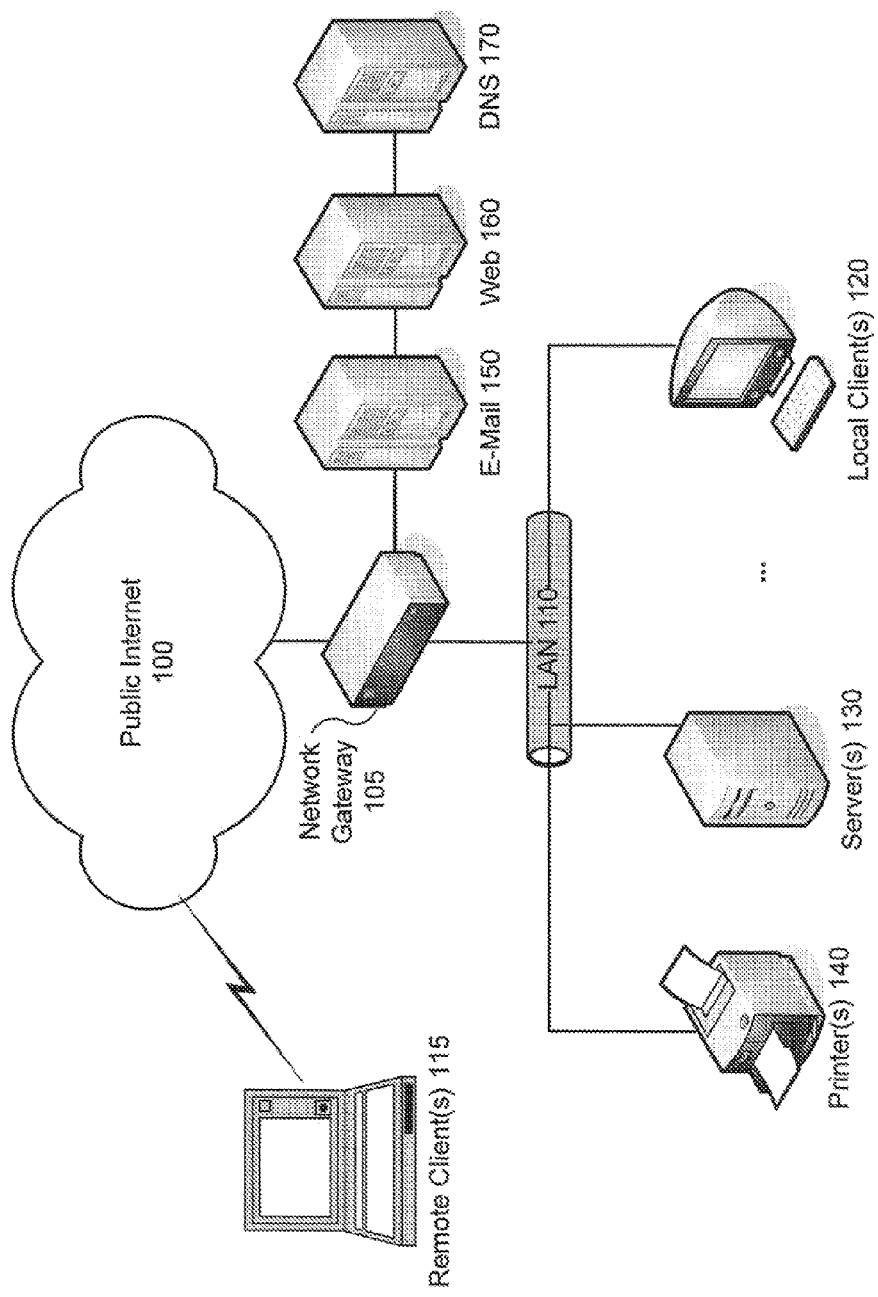
FIG. 1 is a block diagram conceptually illustrating a simplified network architecture in which embodiments of the present invention may be employed.

Methods and systems are described for content filtering of remote file-system access protocols. According to one embodiment, remote file-system access protocol streams, such as Server Message Block (SMB)/Common Internet File System (CIFS) streams, are monitored between the client and server by a network gateway. Files being read and written are buffered into a shared area and at some point examined by one or more filtering mechanisms for malicious, dangerous and/or unauthorized content. For example, a network gateway logically interposed between a client and server may perform content filtering on files and/or other data transferred through the network gateway via the SMB/CIFS protocol. The filtering mechanisms may include, but are not limited to, filters, such as malware scanning, filename pattern blocking, confidential information control, etc. Advantageously, by performing content filtering at the gateway automated malware is unable to spread to unprotected systems and more security is gained over the types of data transferred by remote file-system access protocols.

Embodiments of the present invention provide a file buffer management architecture that maps different file IDs (FIDs), created during a remote file-system access protocol session and referring to the same file, to the same holding buffer to facilitate filling of the holding buffer and to trigger desired content filtering of the holding buffer.

According to one embodiment, a novel method of managing and scanning buffered data is provided to deal with the complexities of remote file-system access protocols that allow multiple client processes and even multiple threads within such processes to perform actions (reads/writes) on any portion of a shared file at any time. An efficient method for management of the buffered data is encompassed in this invention.

In one embodiment, an efficient method is provided for quickly determining when a holding buffer is full without requiring tracking or searching for unmodified portions of the holding buffer.

Importantly, although various embodiments of the content filtering system and methodologies are discussed in the context of a network gateway, they are equally applicable to other virtual or physical network devices or appliances that may be logically interposed between clients and servers, such as firewalls, network security appliances, virtual private network (VPN) gateways, switches, bridges, routers and the like.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While for sake of illustration embodiments of the present invention are described with respect to Server Message Block (SMB)/Common Internet File System (CIFS), the methods and systems described herein are equally applicable to other remote file-system access protocols, such as Samba, Network File System (NFS) Not Quite NFS (NQNFS), Optimized Remote File-system Access (ORFA), Apple Filing Protocol (AFP), NetWare Core Protocol (NCP), Kerberos, Remote File System (RFS), OS/400 File Server file system (QFileSvr.400).

Terminology

Brief definitions of terms used throughout this application are given below.

The terms "connected" or "coupled" and related terms are used in an operational sense and are not necessarily limited to a direct connection or coupling.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The phrase "content filtering" generally refers to performing monitoring or scanning of files and/or other data transfer between a client and a server, such as malware scanning, filename pattern blocking, confidential information control and the like.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrase "network gateway" generally refers to an internetworking system, a system that joins two networks together. A "network gateway" can be implemented completely in software, completely in hardware, or as a combination of the two. Depending on the particular implementation, network gateways can operate at any level of the OSI model from application protocols to low-level signaling.

If the specification states a component or feature "may", "can", "could", or "might" be included or have a characteristic, that particular component or feature is not required to be included or have the characteristic.

The term "proxy" generally refers to an intermediary device, program or agent, which acts as both a server and a client for the purpose of making or forwarding requests on behalf of other clients.

The phrase "remote file-system access protocol" generally refers to a protocol that enables network file sharing. For example, remote file-system access protocols may allow client processes to access remote files located across the Internet or within a corporate intranet on a server in either a sequential or non-sequential manner. Examples of remote file-system access protocols include, but are not limited to Server Message Block (SMB)/Common Internet File System (CIFS), Samba, Network File System (NFS), Not Quite NFS (NQNFS), Optimized Remote File-system Access (ORFA), Apple Filing Protocol (AFP), NetWare Core Protocol (NCP), Kerberos, Remote File System (RFS) and OS/400 File Server file system (QFileSvr.400).

The term "request," unless negated by the context of its usage, generally refers to a remote file-system access protocol request or command issued by a client to a server. According to one embodiment in which SMB is the remote file-system access protocol, some commands can be chained together within the same request. For example, opening a file and reading the file. These types of commands are referred to as ANDX commands.

The term "response," unless negated by the context of its usage, generally refers to a remote file-system access protocol response issued by a server to a client. A response is typically, but need not be responsive to a request by the client.

The term "responsive" includes completely or partially responsive.

The term "server" generally refers to an application, program, process or device in a client/server relationship that responds to requests for information or services by another program, process or device (a server) on a network. The term "server" also encompasses software that makes the act of serving information or providing services possible.

The term "share" when used as a noun herein generally refers to a resource, such as a file-system directory, that is being shared via a remote file-system access protocol. A share is typically referred to by a directory path or a "share name." The share name doesn't need to be the same as the actual name of the object being shared as it exists on the server. For example, the directory path "/My_Documents/Clients/Client_#1/" could be provided with a shorter and more descriptive name "Client_#1_Files." The share name may then take the place of the actual directory name when the share is accessed via a remote file-system access protocol. For example, if the server is named "server," then the path to the share could be specified to the remote file-system access protocol as "\\server\Client_#1_Files." In one embodiment, when a remote file-system access protocol session is initiated, the server assigns a special identifier called a Tree ID (TID) to identify the share for the duration of the session.

The phrase "transparent proxy" generally refers to a specialized form of proxy that only implements a subset of a given protocol and allows unknown or uninteresting protocol commands to pass unaltered. Advantageously, as compared to a full proxy in which use by a client typically requires editing of the client's configuration file(s) to point to the proxy, it is not necessary to perform such extra configuration in order to use a transparent proxy.

Overview

One or more embodiments of the present invention may include combinations of various of the following features:
1. A proxy running within a network gateway intercepting remote file-system access protocol requests/responses exchanged between a client and a server and responsive thereto performing content processing on data exchanged between the client and server.
2. Implementation of a single shared holding buffer per file per session that is associated with the proxy and that is accessible to multiple processes and/or threads to hold data being read and/or written between the client and server via a remote file-system access protocol.
3. Mechanisms for quickly and efficiently determining whether a holding buffer, which may be modified and accessed in a non-sequential manner, is full.
4. Mechanisms for mapping multiple file IDs (FIDs) referring to the same file to one holding buffer and tracking additional references to the holding buffer.
5. Mechanisms for blocking access to files discovered to be infected or detected by other filters.

According to one embodiment of the present invention, a new proxy intercepts incoming SMB/CIFS requests and responses and scans files that are passed back and forth between a client and a server.

According to one embodiment, a buffering mechanism is employed to allow content filtering of data exchanged between the client and server by preserving a copy of the data on the network gateway. Multiple client processes and/or threads of a single client process can access the same server file at the same time and potentially in different areas of the file. As a result, the allocation of a buffer for each thread and/or process may cause the network gateway to run out of memory. Further, the use of a buffer for each thread and/or process may result in only partial filling of a buffer during a particular session, thereby delaying or precluding content processing of the buffered data. Consequently, according to one embodiment, a single shared holding buffer is implemented. In this manner, each process and/or thread refers to the same buffer and fills in portions of the buffer as it is accessed. Advantageously, the shared holding buffer mechanism of various embodiments of the present invention saves memory and allows the buffer to be filled more quickly thereby increasing the likelihood of triggering content processing of the buffer.

In one embodiment, content processing of the holding buffer is triggered responsive to the holding buffer becoming full (or completely modified). According to one embodiment, a usage table and free pointer methodology are employed to track how full the holding buffer is and allow efficient determination of the free buffer space.

In accordance with the SMB/CIFS protocol, a filename can be uniquely identified by a combination of the filename path and a tree identifier (TID). According to one embodiment, this information is used in a special table to identify a file that has been opened and associated it with a file identifier (FID). Note, several processes may open the same file and obtain different FIDs. Consequently, according to one embodiment, a mechanism is provided to map multiple FIDS referring to the same file to one holding buffer by way of a file map table and a holding buffer context table.

In one embodiment, mechanisms are provided for blocking access to files discovered to be infected. Assuming a remote file-system access protocol that allows partial (e.g., random or sequential) file access, once a file is discovered by the network gateway to be infected, part of the file will already have been read by or written to the client or the server, respectively. As a result, the server or client may contain a partial file with a corrupted version of a virus. According to one embodiment, once a file is discovered by the network gateway to be infected, appropriate error codes can be returned to the client in remote file-system access protocol responses to deny access to the client and/or to trigger appropriate action by the client.

FIG. 1 is a block diagram conceptually illustrating a simplified network architecture in which embodiments of the present invention may be employed. In this simple example, one or more remote clients 115 are coupled in communication with a local area network (LAN) 110 via the public Internet 100 and a network gateway 105, which incorporates various novel content filtering methodologies in relation to remote file-system access protocol streams that are described further below. In the present example, the network gateway 105 is also coupled to an email server 150, a web server 160 and a domain name server (DNS) 170.

In the exemplary network architecture of FIG. 1, LAN 110 includes one or more printers 140, one or more servers 130 and one or more local clients 120. According to one embodiment, remote clients 115, local clients 120 and servers 130 employ a remote file-system access protocol to share resources, such as a directory tree, with each other. In one embodiment, the network gateway 105 includes a transparent remote file-system access protocol proxy that intercepts client remote file-system access protocol requests and server remote file-system access protocol responses. Since the proxy is transparent, handlers need not be implemented for each request and each response. In fact, according to one embodiment, only a few requests and responses actually trigger any substantive content filtering processing activity on the part of the transparent proxy. For example, handlers may only be implemented for requests/responses relating to initiating a session, opening a file, reading a file, writing a file and closing a file. All other requests/responses not used by the proxy may be passed through to the server/client untouched.

Importantly, in the context of the present example, remote clients 115 and local clients 120 may take on the role of a server when sharing local files stored thereon, for example.

Figure 2:
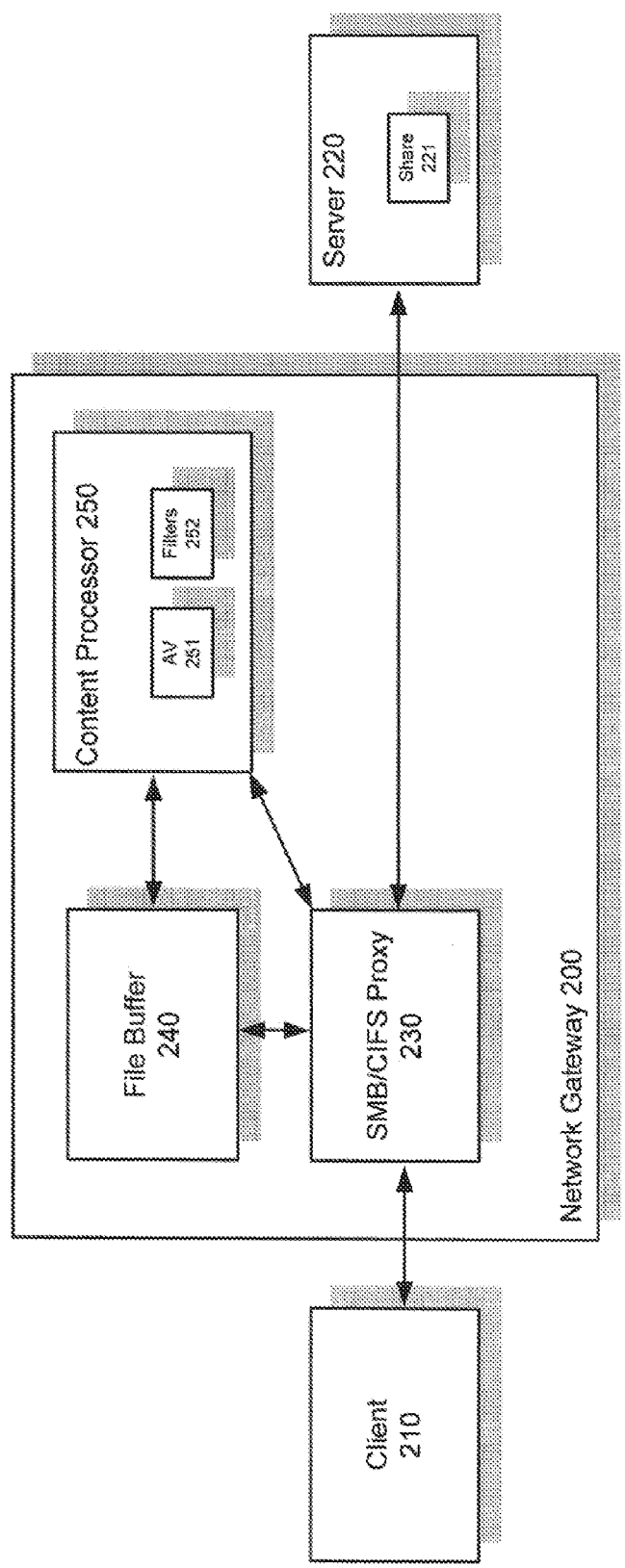
FIG. 2 is a block diagram conceptually illustrating interaction among various functional units of a network gateway with a client and server in accordance with one embodiment of the present invention.

FIG. 2 is a block diagram conceptually illustrating interaction among various functional units of a network gateway 200 with a client 210 and a server 220 in accordance with one embodiment of the present invention. While in this simplified example, only a single client, i.e., client 210, and a single server, i.e., server 220, are shown interacting with the network gateway 200, it should be understood that many local and/or remote clients and servers may interact with the network gateway 200 and directly with each other.

According to the present example, the network gateway 200, which may be a virtual or physical device, includes three interacting functional units, a SMB/CIFS proxy 230, a file buffer 240 and a content processor 250. In one embodiment, the SMB/CIFS proxy 230 is a transparent proxy that implements handlers for SMB/CIFS requests/responses relevant to the performance of content filtering activities and passes through those not relevant to the performance of content filtering activities.

As described in detail below, the file buffer 240 maintains a copy of file data read or written by the client 210 from/to a share 221 associated with the server 220 to facilitate content filtering.

According to one embodiment, the content processor 250 performs content filtering on data stored within the file buffer 240. The content processor 250 may proactively monitor the file buffer 240 to determine when content filtering should be performed, may periodically initiate content filtering or may perform content filtering responsive to external events (e.g., a request by the file buffer and/or by the SMB/CIFS proxy 230). In the current example, content processor 250 includes an antivirus (AV) filter 251 and one or more other filters 252. The AV filter 251 may apply current or future virus detection methodologies, such as scanning, integrity checking, interception, and heuristic detection and the like, to determine the presence of malicious code in the data being scanned. The one or more other filters 252 may perform filename pattern blocking, confidential information control and the like. In one embodiment, the content processor 250 is an integrated FortiASIC™ Content Processor chip developed by Fortinet, Inc. of Sunnyvale, Calif. In alternative embodiments, the content processor 250 may be a dedicated coprocessor or software to help offload content filtering tasks from a host processor.

While in the present example, the SMB/CIFS proxy 230, the file buffer 240 and the content processor 250 are all shown as residing within or as part of the same network device, in alternative embodiments one or more of the SMB/CIFS proxy 230, the file buffer 240 and the content processor 250 may be located remotely from the other functional units. According to one embodiment, the hardware components and/or software modules that implement the SMB/CIFS proxy 230, the file buffer 240 and the content processor 250 are generally provided on or distributed among one or more Internet and/or LAN accessible networked devices, such as one or more network gateways, firewalls, network security appliances, switches, bridges, routers, data storage devices, computer systems and the like. In one embodiment, the functionality of the separate functional units may be merged in various combinations. For example, the file buffer 240 may be incorporated with the SMB/CIFS proxy 230 or the SMB/CIFS proxy 230 may be incorporated within the content processor.

As indicated above, for sake of illustration, various embodiments of the present invention are described in the context of the SMB/CIFS protocol suite; however, such examples are not intended to limit the scope of the present invention. Rather, the methodologies described herein have applicability to remote file-system access protocols generally.

Figure 3:
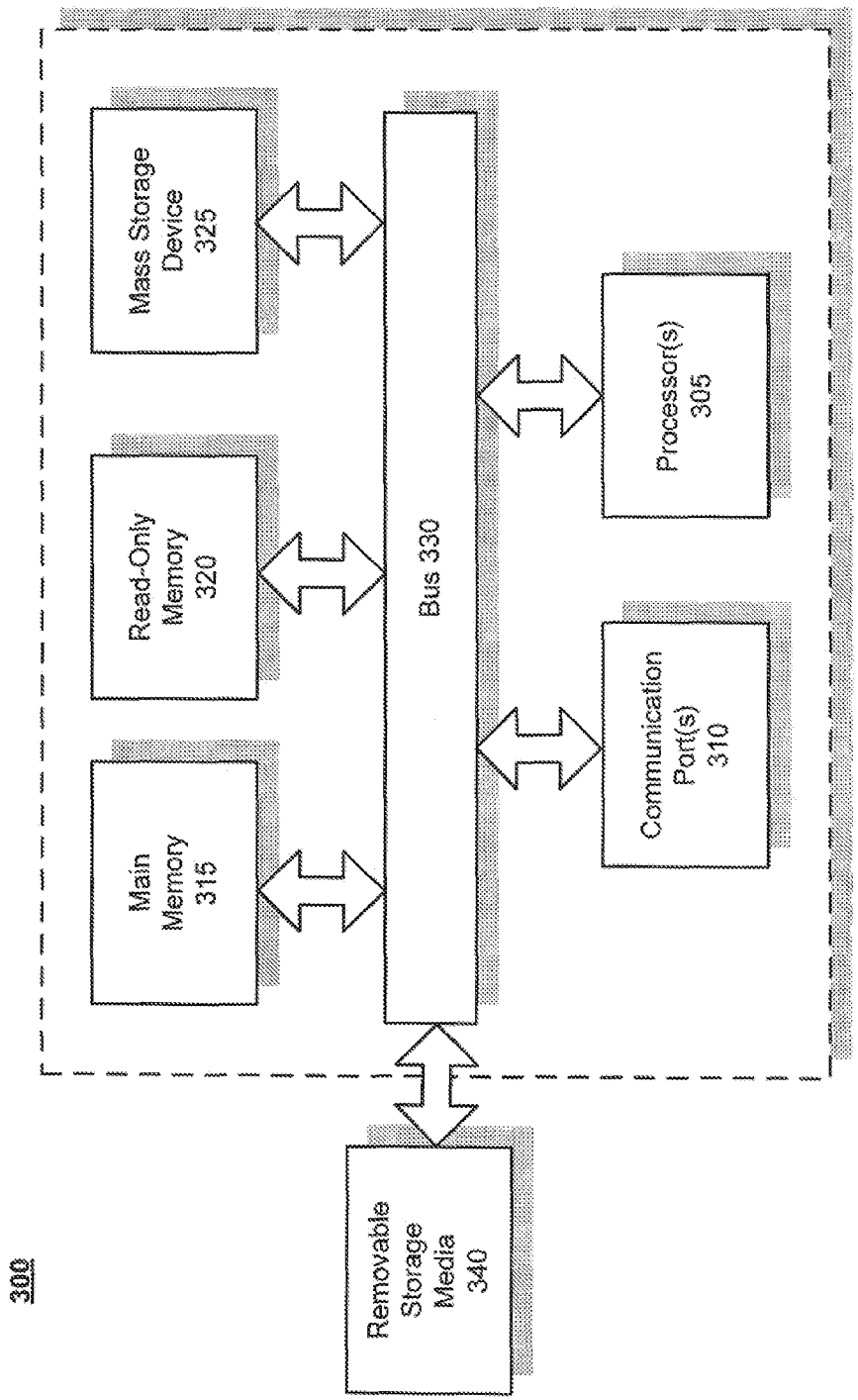
FIG. 3 is an example of a computer system with which embodiments of the present invention may be utilized.

FIG. 3 is an example of a computer system with which embodiments of the present invention may be utilized. The computer system 300 may represent or form a part of a network gateway, firewall, network security appliance, switch, bridge, router, data storage devices, server and/or other network device implementing one or more of the SMB/CIFS proxy 230, the file buffer 240 and the content processor 250. According to FIG. 3, the computer system 300 includes one or more processors 305, one or more communication ports 310, main memory 315, read only memory 320, mass storage 325, a bus 330, and removable storage media 340.

The processor(s) 305 may be Intel® Itanium® or Itanium 2® processor(s), AMD® Opteron® or Athlon MP® processor(s) or other processors known in the art.

Communication port(s) 310 represent physical and/or logical ports. For example communication port(s) may be any of an RS-232 port for use with a modem based dialup connection, a 10/100 Ethernet port, or a Gigabit port using copper or fiber. Communication port(s) 310 may be chosen depending on a network such a Local Area Network (LAN), Wide Area Network (WAN), or any network to which the computer system 300 connects.

Communication port(s) 310 may also be the name of the end of a logical connection (e.g., a Transmission Control Protocol (TCP) port or a Universal Datagram Protocol (UDP) port). For example communication ports may be one of the Well Know Ports, such as UDP ports 137 or 138, TCP port 139 (used for NETBIOS Session Service-NetBT (NetBIOS over TCP/IP)), TCP port 445 (SMB over TCP/IP) and TCP port 80 (used for HTTP service), assigned by the Internet Assigned Numbers Authority (IANA) for specific uses.

Main memory 315 may be Random Access Memory (RAM), or any other dynamic storage device(s) commonly known in the art.

Read only memory 320 may be any static storage device(s) such as Programmable Read Only Memory (PROM) chips for storing static information such as instructions for processors 305.

Mass storage 325 may be used to store information and instructions. For example, hard disks such as the Adaptec® family of SCSI drives, an optical disc, an array of disks such as RAID, such as the Adaptec family of RAID drives, or any other mass storage devices may be used.

Bus 330 communicatively couples processor(s) 305 with the other memory, storage and communication blocks. Bus 330 may be a PCI/PCI-X or SCSI based system bus depending on the storage devices used.

Optional removable storage media 340 may be any kind of external hard-drives, floppy drives, IOMEGA® Zip Drives, Compact Disc-Read Only Memory (CD-ROM), Compact Disc-Re-Writable (CD-RW), Digital Video Disk (DVD)-Read Only Memory (DVD-ROM), Re-Writable DVD and the like.

Figure 4:
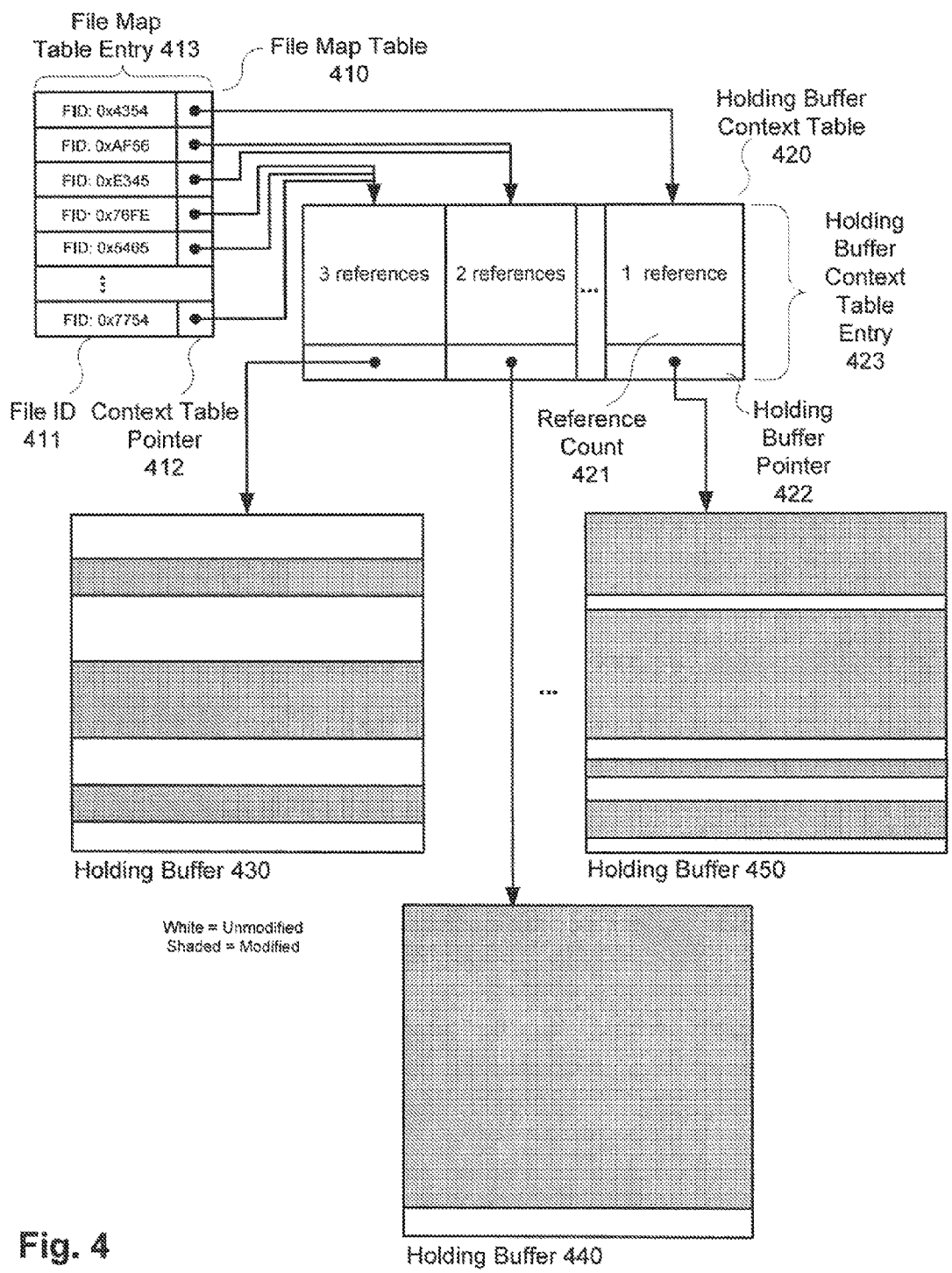
FIG. 4 is a block diagram conceptually illustrating various data structures employed by a file buffer in accordance with an embodiment of the present invention.

FIG. 4 is a block diagram conceptually illustrating various data structures employed by a file buffer in accordance with an embodiment of the present invention. According to the present example, the file buffer, such as file buffer 240, includes a file map table 410, a holding buffer context table 420 and one or more holding buffers 430, 440 and 450. Each of these data structures may be stored in non-persistent storage, persistent storage (e.g., a hard drive or memory card), shared memory, allocated memory, static memory.

On a server, each file belongs to a particular tree commonly known as a share. When a remote file-system access protocol session is initiated, the user has chosen a particular file from a share. According to the SMB/CIFS protocol suite, the server assigns a special identifier called the tree ID (TID) to identify this share for the duration of the session. Note, the TID may be different for separate sessions even though it is the same share being accessed.

According to one embodiment, the file map table 410 maps references to the same file of a share to a holding buffer or holding buffers (e.g., holding buffers 430, 440 and/or 450) corresponding to that file via the holding buffer context table 420. In the current example, the file map table 410 includes a file map table entry 413 for each FID returned by the server during a remote file-system access protocol session. The file map table entry 413 also includes a corresponding pointer to a holding buffer context table entry 423 in the holding buffer context table 420, which maintains a reference count 421 and a holding buffer pointer 422 to the holding buffer corresponding to the open file. While in the present example, each holding buffer context table entry 423 refers to only a single holding buffer, in alternative embodiments holding buffer context table entries 423 may refer to multiple holding buffers.

Depending upon the remote file-system access protocol, during a single session, multiple programs and/or multiple threads within the same program may make requests for the same or different files using the same session connection. In the context of the SMB/CIFS protocol suite, a filename can be uniquely identified by a combination of the filename path and the TID. This information may be maintained in a special table, such as the file map table 410, to identify a file that has been opened and to store the corresponding FID. Once the file is open, multiple threads of a single process may operate on the file using the same FID. However, each time a file is opened, a new FID may be returned. Depending upon the particular implementation, the FID may consist of a number, a character string, a string of binary digits or other data type.

In the SMB/CIFS protocol suite, each program is identified by a Process ID (PID) in the SMB header (not shown). A particular thread of a program is identified using the Multiplex ID (MID) (not shown). Thus, it would be quite challenging to manage the many files that may be accessed and the states of multiple threads that are accessing the files. Additionally, multiple processes and/or threads of a single process can access the same file at the same time and potentially in different areas of the file. If a buffer was allocated for each thread and process the network gateway 200 would quickly run out of memory and each of the buffers may only be partially filled for the duration of the session and therefore may never be scanned (assuming scanning is trigged as a result of a buffer being filled). As a result, in accordance with one embodiment of the present invention, a single holding buffer concept is implemented that maps all references to the same file during a session to the same holding buffer. Advantageously, by using a single holding buffer per open file per session, each process and/or thread will refer to the same buffer and fill in portions of the buffer as it is accessed. This not only saves much memory but allows the buffer to be filled quickly and then scanned. In alternative embodiments, references to the same file across sessions may also be mapped to a common holding buffer or multiple holding buffers may be employed for an open file within or across sessions.

In the present example, portions of the holding buffers 430, 440 and 450 that have been modified are shaded and unmodified portions are unshaded. In one embodiment, the holding buffer corresponds to the size of the open file and corresponding portions of the holding buffer are modified as the client reads data from or writes data to the file on the server.

Figure 5:
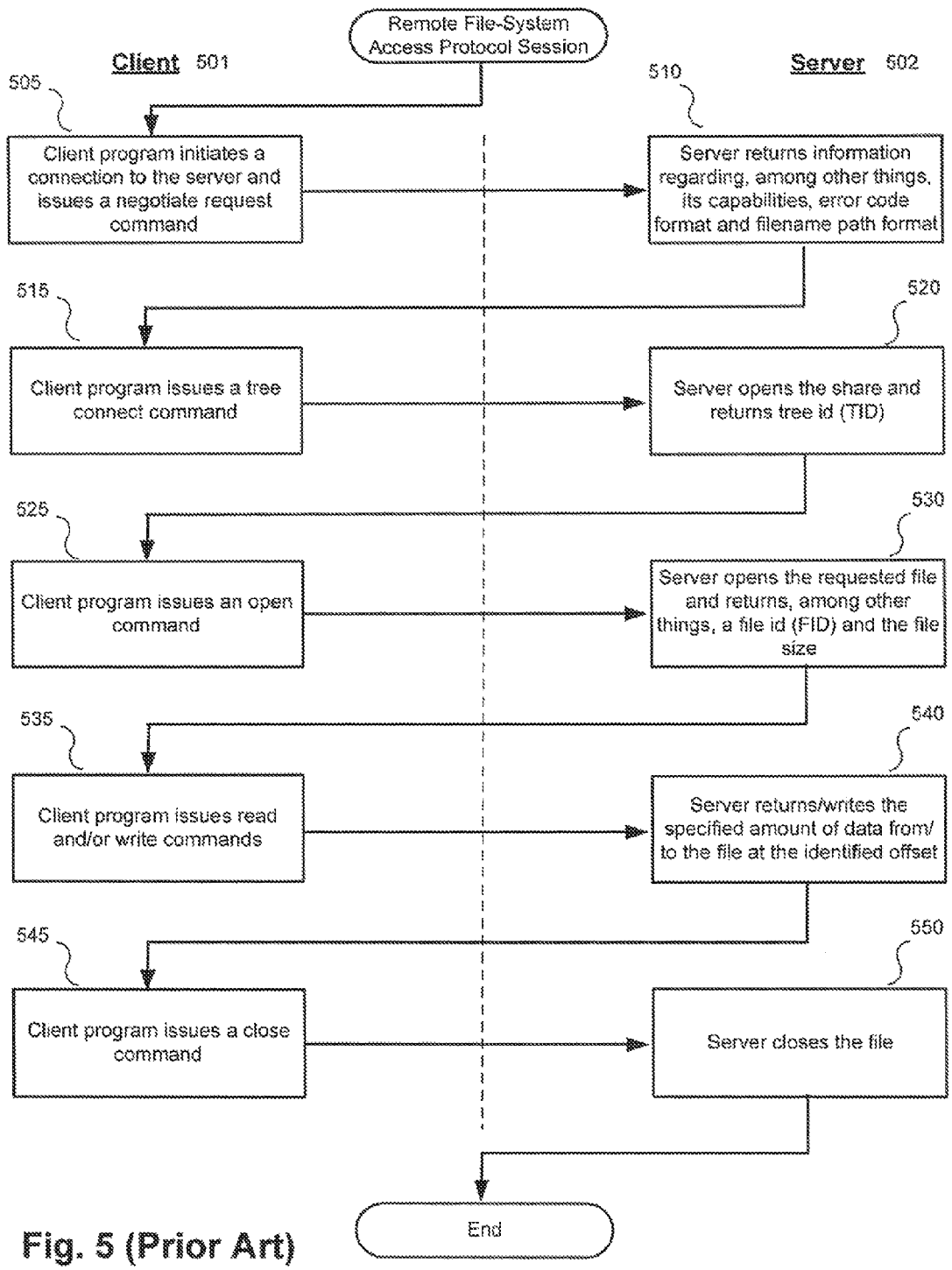
FIG. 5 is a high-level, simplified flow diagram illustrating conventional remote file-system access protocol session processing.

FIG. 5 is a high-level, simplified flow diagram illustrating conventional remote file-system access protocol session processing. At block 505, the client program initiates a connection to the server and issues a negotiate request command. Typically, the negotiate request client command is used to determine the capabilities of the server and decide on various settings such as error code format, filename path format (unicode, long filename support, etc.) and various other options. In accordance with the SMB/CIFS protocol suite, before two machines can start communicating with SMB, they negotiate the dialect of CIFS to use. The SMB_COM_NEGOTIATE client command is the first message sent by client to the server. This client command includes a list of SMB dialects supported by the client. Responsive to the negotiate request command, at block 510, the server returns information regarding, among other things, its capabilities, error code format and filename path format. When the connection request is accepted, the server response indicates which SMB dialect should be used by the client.

At block 515, the client program issues a tree connect command, which in the context of SMB/CIFS includes the name of the share the client wants to access. At block 520, the server opens the share and if successful provides the client with a TID in the SMB header for the client to use in connection with subsequent requests relating to this shared resource.

At block 525, the client program issues an open command (e.g., an SMB_COM_OPEN client command with the name of the file, relative to the TID, that the client wants to open). At block 530, the server attempts to open the requested file and upon successfully opening the file returns to the client a FID the client should supply for subsequent operations on this file and the size of the file.

At block 535, the client program issues read and/or write commands. In accordance with the SMB/CIFS protocol, a SMB_COM_READ client command includes the TID, FID, file offset and number of bytes to read. Similarly, a SMB_COM_WRITE client command includes the TID, FID, file offset, size of data block (in some cases) and the data to be written. At block 540, the server returns/writes the data from/to the specified offset within the identified file.

At block 545, the client program issues a close command to close the file represented by TID and FID. At block 550, the server closes the file and responds with a success or error code. Finally, to end the session, the client disconnects (not shown) from the resource represented by the TID. For example, in the context of the SMB/CIFS protocol, the client issues a SMB_COM_TREE_DISCONNECT command.

Figure 6:
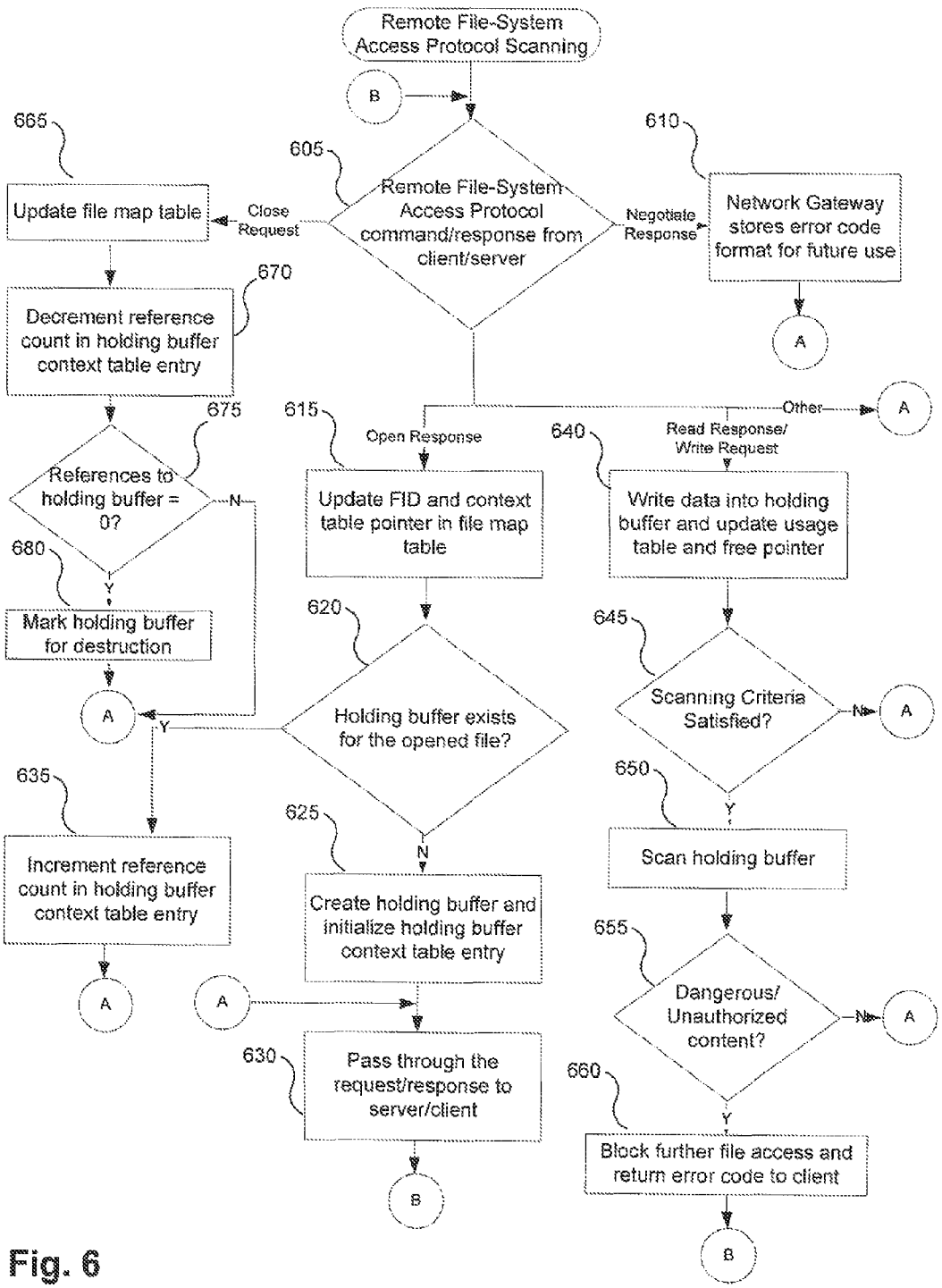
FIG. 6 is a simplified flow diagram illustrating a remote file-system access protocol scanning process that may be implemented by a Server Message Block (SMB)/Common Internet File System (CIFS) proxy logically interposed between a client and a server in accordance with an embodiment of the present invention.

FIG. 6 is a simplified flow diagram illustrating a remote file-system access protocol scanning process that may be implemented by a Server Message Block (SMB)/Common Internet File System (CIFS) proxy logically interposed between a client and a server in accordance with an embodiment of the present invention. Conceptually, the transparent SMB/CIFS proxy may be thought of as residing on the vertical dashed line shown in FIG. 5. As such, the SMB/CIFS proxy acts as a server with respect to the client 501 and as a client with respect to the server 502.

According to one embodiment, the remote file-system access protocol proxy is associated with a network gateway and intercepts client remote file-system access protocol requests and server remote file-system access protocol responses. In one embodiment, handlers are only implemented for a subset of the requests and responses and therefore the remote file-system access protocol proxy may be a transparent proxy as only some of the requests and responses are relevant to the task of content filtering. For example, in the context of the SMB/CIFS protocol suite, handlers may only be implemented for requests/responses relating to initiating a session (e.g., SMB_COM_NEGOTIATE and/or SMB_COM_SESSION_SETUP_ANDX), opening a file (e.g., SMB_COM_OPEN), reading a file (e.g., SMB_COM_READ), writing a file (e.g., SMB_COM_WRITE) and closing a file (e.g., SMB_COM_CLOSE). All other requests/responses not used by the proxy may be passed through to the server/client untouched.

After a remote file-system access protocol request/response is intercepted, at decision block 605, a determination is made by the remote file-system access protocol scanning process regarding the type of remote file-system access protocol command or response that has been received. If the remote file-system access protocol request/response is a negotiate response from the server, then processing continues with block 610. If the request/response is an open response from the client, then processing branches to block 615. If the request/response is a read response from the server or a write request from the client, then processing continues with block 640. In one embodiment, all other requests/responses are passed through unchanged to the server/client by proceeding to block 630.

At block 610, a determination has been made that the intercepted remote file-system access protocol request/response is a negotiate response issued by the server to the client. According to one embodiment, the error code format negotiated and returned in this response is of interest and is stored for later use in connection with modifying responses. After block 610, processing continues with block 630.

At block 615, a determination had been made that the intercepted remote file-system access protocol request/response is an open response issued by the server to the client. If the previously issued open request to which this open response corresponds was successful on the server side, a FID is returned to the client as well as the size of the opened file. According to the present example, upon receiving the open response, a new file map table entry 413 is inserted into the file map table 410 and the FID 411 and the context table pointer 412 are initialized appropriately. According to the present example, a special mapping is created for the FID to a particular holding buffer. Note, several processes may open the same file and obtain different FIDS, but in accordance with various embodiments of the present invention they will all be mapped to the same holding buffer.

At decision block 620, it is determined whether a holding buffer already exists for the file that has just been opened. If not, then processing continues with block 625. Otherwise, if a holding buffer already exists that corresponds to the current file, then processing branches to block 635.

At block 625, a holding buffer is created and corresponding holding buffer context table entry 423 is initialized. According to one embodiment, in which each holding buffer context table entry 423 includes a reference count 421 and a holding buffer pointer 422, the reference count 421 is initialized to one and the holding buffer pointer 422 is initialized to the address of the beginning of the holding buffer. After block 625, processing continues with block 630.

At block 630, the request/response is passed through to the server/client. Processing then resumes with block 605.

At block 635, a holding buffer has previously been created for this file. Consequently, in an embodiment in which only a single holding buffer is employed for each file opened during a session, the reference count 421 of the holding buffer context table entry 423 corresponding to the holding buffer is incremented to reflect the existence of another reference to the file.

At block 640, a determination has been made that the intercepted remote file-system access protocol request/response is a read response issued by the server to the client or a write request made by the client to the server. According to the present example, the intercepted data (i.e., the data returned by the server responsive to the client's read request or the data provided by the client to be written to the specified file on the server) is written into the corresponding holding buffer (e.g., holding buffer 430, 440 or 450) at the appropriate offset. According to the present example, a free pointer (e.g., free pointer 730) and usage table (e.g., usage table 710) are maintained for each holding buffer (e.g., holding buffers 430, 440 and/or 450) to allow an efficient determination regarding the fullness of the holding buffer. Responsive to writing data into the holding buffer the free pointer and usage table are updated appropriately as described further below.

At decision block 645, it is determined whether one or more criteria for initiating scanning of the holding buffer (e.g., holding buffer 430, 440 or 450) have been satisfied. In one embodiment, the criteria include the holding buffer having been completely filled by the read and write requests of the various client processes accessing the file. In one embodiment, the holding buffer may be examined for unmodified portions to determine whether it has been completely filled. Alternatively, an efficient fullness test can be performed as described with reference to FIG. 7.

According to one embodiment, an additional triggering condition for content scanning includes a write request representing data being appended to the end of the file. Empirical evidence indicates appending data to the end of a file is a common behavior of file-infecting viruses. Experimentation with various forms of live file-infecting viruses revealed that when a file-infecting virus attempted to spread throughout the share it would, in most cases, read the header of the file first, make some modifications, and then begin appending itself to the end of the file. Since such viruses first obtain and change the headers, the header information as well as the data attempting to be appended are available in the holding buffer for content filtering. The rest of the buffer is irrelevant for purposes of detecting such viruses. Consequently, content filtering can be successfully performed upon observing such behavior with the only downside being redundant scanning for each appending write that is issued by the client.

Various other triggering conditions may be used to initiate content filtering, such as the observation of other behaviors commonly exhibited by file-infecting viruses. In some embodiments, the holding buffers may periodically be scanned without regard for their state of fullness. At any rate, if one or more of the scanning criteria are satisfied, then processing continues with block 650; otherwise, processing resumes with block 630.

At block 650, the holding buffer is scanned. As indicated earlier, the content scanning or content filtering may include the examination of the holding buffer by one or more filtering mechanisms for malicious, dangerous and/or unauthorized content. The content filtering mechanisms may include, but are not limited to malware scanning, filename pattern blocking, confidential information control, etc.

At decision block 655, the existence of dangerous or unauthorized content is determined. If such content is found during the scanning, then processing branches to block 660. Otherwise, if no dangerous or unauthorized content is discovered during the scanning, then processing continues with block 630

At block 660, dangerous or unauthorized content has been read from or written to the file. Consequently, further access to the file in question may be blocked by returning an appropriate error code to the client by modifying the server response. Processing then resumes with block 605.

Once it has been discovered that a file is infected, part of the file will have either been read or written to the client or server respectively. According to one embodiment, a second holding buffer, such as a shadow buffer (not shown) that only records data read from the server may be used to address this potential file corruption. The shadow buffers may have their own usage tables and be logically linked to the main holding buffers. If a virus, for instance, reads the header of a file, the initial read will be stored in both the holding buffer and the shadow buffer, then at the point at which the virus attempts to modify the header and write it back to the server only the holding buffer will contain the change and the shadow buffer will maintain the original header. When, he virus begins to append and is eventually detected, again the appended data will only have been added to the holding buffer and not to the shadow buffer. Consequently, in some embodiments, the shadow buffer may be used to restore the original file on the server from the clean copy maintained in the shadow buffer. Assuming virus writers begin to implement countermeasures to the shadow buffer mechanism, e.g., if the virus reads and writes then reads the same block again, one solution may be to store only the first read from a given block of the file to the shadow buffer.

In one embodiment, by using the information regarding the error code format obtained during the session negotiation a response can be created with an error code denying access to the file by the client. Alternatively or additionally, the error code returned may trigger some other action, such as closing of the file and/or a local content scanning process, in the client program. Meanwhile, the server may contain a partial file with a corrupted version of the virus that will unlikely be able to be opened or executed. This partial file may however be detected by other host based antivirus software installed on the server. After receiving an error code responsive to a read or write request, the client will likely close the file. Notably, care in implementation is again required in connection with SMB ANDX chained commands since one or more early commands of the chain may have succeeded but subsequent ones fail. The structure of the chain should nevertheless be retained in the response to the client in order to prevent compatibility problems.

At block 665, a determination had been made that the intercepted remote file-system access protocol request/response is a close request issued by the client to the server. According to the present example, this will cause one of the file map table entries 413 to be removed from the file map table 410.

At block 670, the reference count 421 in the corresponding holding buffer context table entry 423 is decremented to reflect that fact that one fewer process is referencing the file.

At decision block 675, it is determined if no references are currently being made to the file. If the number of references to the holding buffer is zero, then processing continues with block 680; otherwise, if references remain to the holding buffer, then processing continues with block 630.

If the number of references to the holding buffer is zero, then it can be destroyed. However, in the present example, at block 680, the holding buffer is simply marked for destruction. An asynchronous cleanup routine may destroy it at a later point thereby giving the holding buffer a chance to be resurrected again if it is accessed again shortly after the last close. For example, empirical evidence suggests when a user edits a file over a share, often the whole file is read over to the client computer and then closed and reopened for writing immediately afterwards.

Note that for purposes of clarity and in order to simplify the present example a special characteristic of SMB, command chaining, has been ignored above. In the context of SMB, some commands can be chained together within the same request. For example opening a file and reading the file. These types of commands are called ANDX commands. While difficult to illustrate in a flow diagram, in order to function correctly, the proxy of the present example would be implemented to follow these command chains and act upon any data or information required from the commands.

FIGS. 7A-D are block diagrams conceptually illustrating various states of a holding buffer and a corresponding free pointer and usage table that may be used to efficiently determine whether the holding buffer is full in accordance with an embodiment of the present invention.

Some difficulties arise as a result of the way various remote file-system access protocols, such as SMB, are designed. For example, since the SMB protocol allows a file to be read and/or written at any offset, there can be no guarantee at any particular time that the whole file will be available in the holding buffer in order to facilitate successful content processing. Consequently, in accordance with various embodiments of the present invention, a tracking mechanism is employed to quickly and efficiently indicate whether the holding buffer is full.

In one embodiment, the fullness tracking mechanism includes the use of a special usage table 710 and a pointer 730 called the free pointer. The usage table 710 may be a smaller buffer, a fraction, such as $\frac{1}{8}^{th}$, the size of the actual holding buffer 720, where each bit 711 in the usage table 710 represents a number of bits, such as a byte 721 in the real holding buffer 720. As a particular byte is modified in the real holding buffer 720, the corresponding bit or bits are set in the usage table 710.

In one embodiment, the usage table is initialized in some predictable way (e.g., all nulls) to allow a determination to be made regarding the corresponding blocks of data in the holding buffer that have actually been read/written from/to the server versus blocks that are still in the initialized state. The holding buffer may also be initialized at creation, for example, by filling it with nulls, a single repeated character or random characters. According to the present example, corresponding blocks of data, e.g., bytes, that have been modified in the holding buffer will appear in the usage table as a block of bits that have been set, whereas areas that have not yet been touched will be unset in the usage table. It is possible that data read into the holding buffer is identical to its initialized state e.g., a block of nulls may be read into a holding buffer that was initialized to nulls; however, the block of nulls read will still be represented in the usage table as set bits. It is also possible for the same block or portion of a block to be read or written again, but does not affect the state of the usage table since that area has already been modified once before.

In FIGS. 7A-D, bits 711 of the usage table 710 set to zero indicate the corresponding byte 721 of the holding buffer 720 are unmodified (i.e., that byte of the file has not yet been read by the client or written to by the client). Unmodified bytes 721 of the holding buffer 720 are unshaded and modified bytes 721 of the holding buffer 720 are shaded.

Figure 7A:
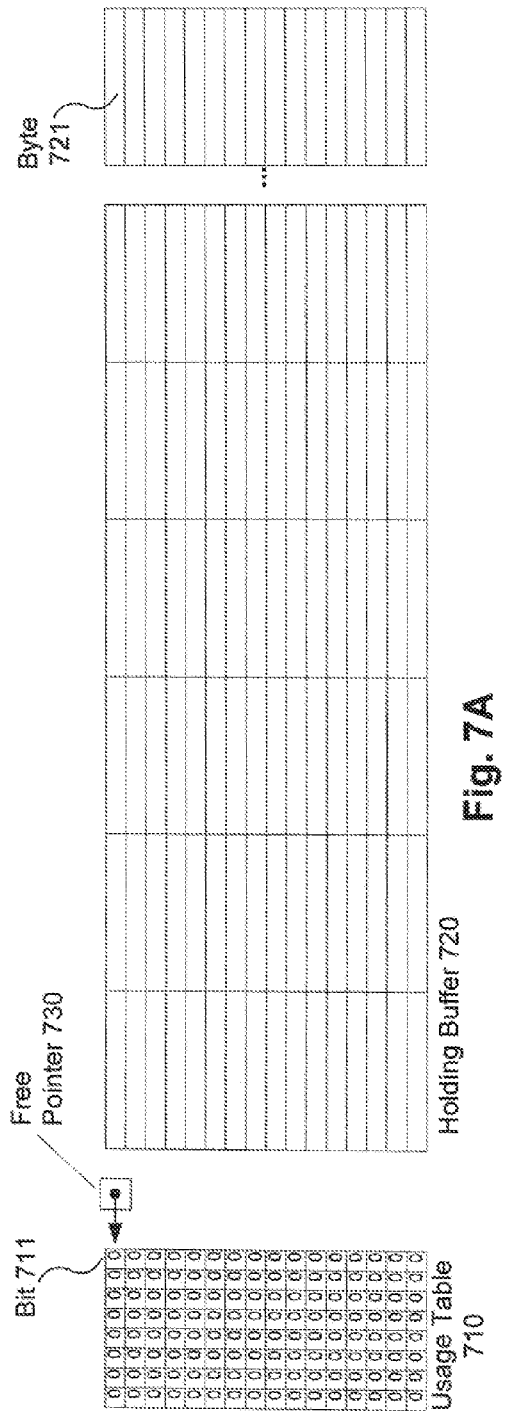
FIGS. 7A-D are block diagrams conceptually illustrating various states of a holding buffer and a corresponding free pointer and usage table that may be used to efficiently determine whether the holding buffer is full in accordance with an embodiment of the present invention.

FIG. 7A illustrates the usage table 710, free pointer 730 and holding buffer 720 in an initial state before any data has been read from or written to the associated file. As illustrated in the simplified example of FIG. 7A, the free pointer 730 initially points at the beginning of the usage table 710.

Figure 7B:
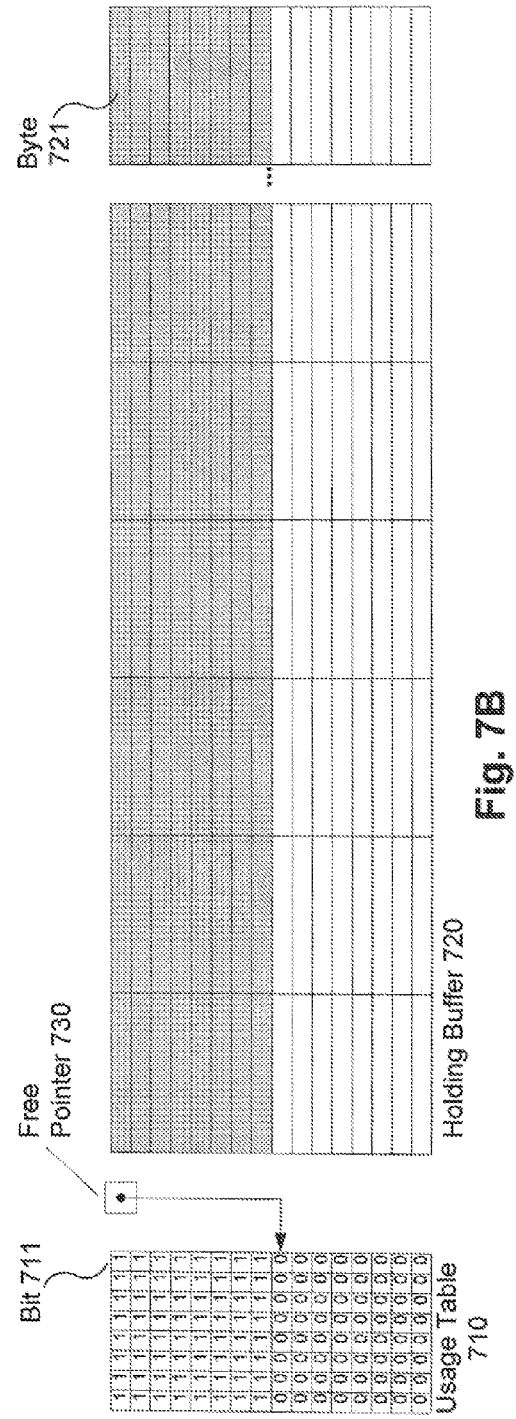

As illustrated in the simplified example of FIG. 7B, at which point the first 64 bytes of the holding buffer 720 have been modified, as each full byte (8 bits of the usage table 710 representing 8 bytes in the real holding buffer 720) is filled, the free pointer 730 is incremented to the next byte. When the holding buffer 720 is not full (as is the case in FIGS. 7A-C), the free pointer 730 will always point to the first non-full byte in the usage table 710.

Figure 7C:
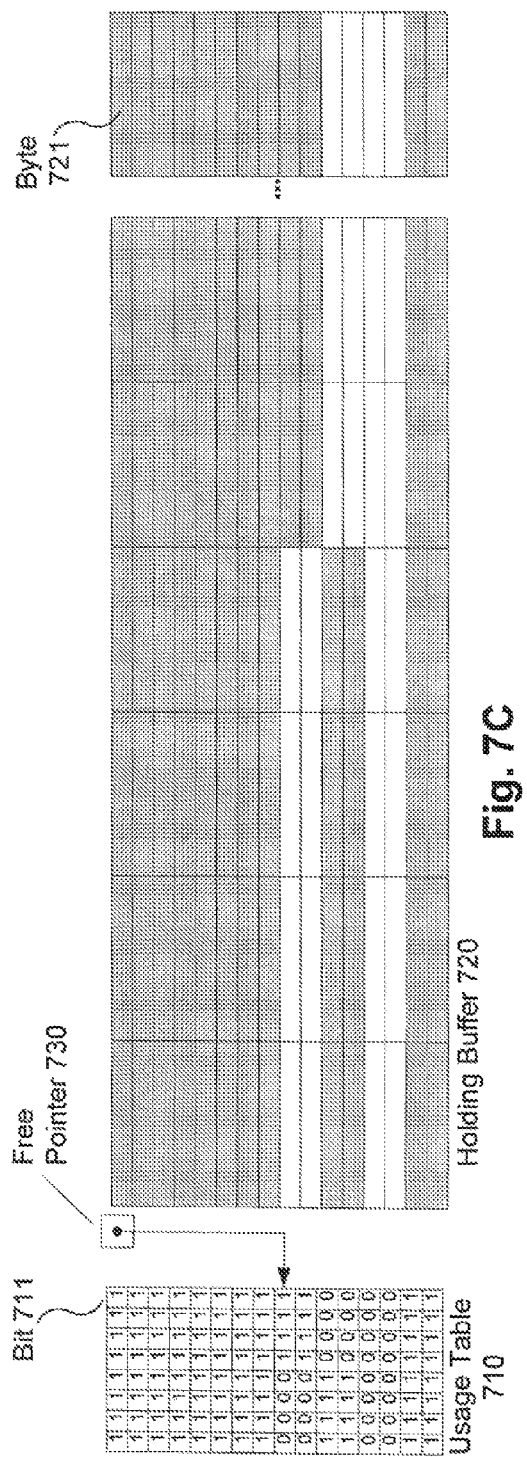

Notably, as illustrated with reference to FIG. 7C, the holding buffer 720 can still be filled at offsets further into the file than the free pointer 730, but the free pointer 730 will not move until the current location has been filled. As a note, in the current example, as long as the holding buffer 720 is not full, the free pointer 730 always points to the earliest unmodified block in the usage table 710.

Figure 7D:
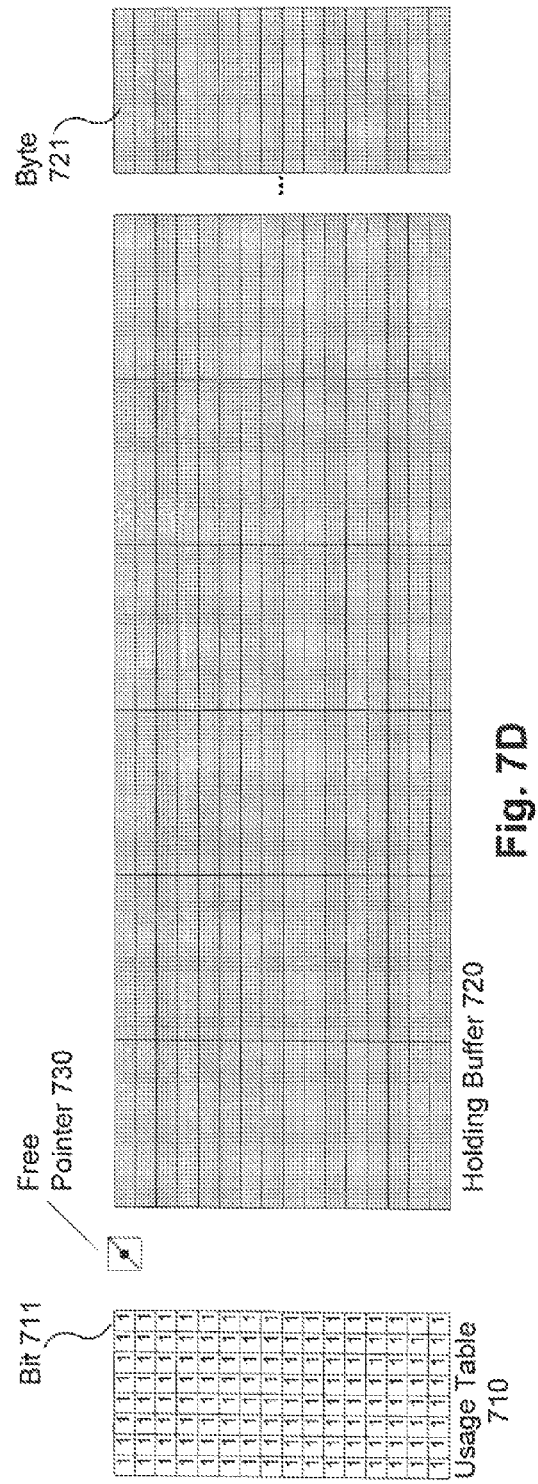

As illustrated by FIG. 7D, if the free pointer 730 is incremented beyond the end of the usage table 710 (e.g., set to NULL), then the whole holding buffer 720 has been filled at that point and it is safe to process its content. As should be appreciated, this fullness tracking mechanism saves development effort and increases run-time efficiency since there is no need to track (and/or search for) each free chunk in the file.

In alternative embodiments, the free pointer 730 need not be used and instead the usage table bits 711 may be logically ANDed to determine the existence of any unmodified portions of the holding buffer. In some embodiments, multiple pointers may be used to track free or filled sections of a particular holding buffer.

While in the simplified example illustrated by FIGS. 7A-D, the usage table elements consist of a single bit corresponding to a single byte of the holding buffer, it is contemplated that the usage table elements could comprise one or more bits, one or more bytes, one or more numbers or one or more strings. Further, each usage table element may correspond to one or more bits of the holding buffer or one or more bytes of the holding buffer. In general, one bit of the usage table corresponds to n bytes of the holding buffer. For example, one bit in the usage table may represent a four byte unsigned long value (32 bits) or a long long value (64 bits) or more. The more data from the holding buffer that is represented by each bit of the usage table, the smaller the usage table will be; however, to optimize for speed, implementations will likely wish to align the data on block boundaries to facilitate application of bit masks. Optimal speed is presently thought to be achieved at a ratio of approximately one usage table bit to less than or equal to four bytes of holding buffer for a 32-bit processor or approximately one usage table bit to less than or equal to eight bytes for a 64-bit processor.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising
receiving at a network device, logically interposed between a client and a server, a remote file-system access protocol request from the client, the remote file-system access protocol request representing a request to make a partial file access to a file associated with a share of the server;
the network device issuing the remote file-system access protocol request to the server on behalf of the client;
the network device implementing a single shared holding buffer for the file during a particular remote file-system access protocol session, wherein the single shared holding buffer is used for both read and write accesses to the file and is used for accesses to the file by a plurality of processes running on the client by mapping different file IDs referring to the file to the single shared holding buffer;
the network device buffering into the single shared holding buffer data being read from or written to the file as a result of the remote file-system access protocol request; and
responsive to a predetermined event in relation to the remote file-system access protocol or the holding buffer, the network device determining the existence or non-existence of malicious, dangerous or unauthorized content contained within the holding buffer by performing content filtering on the holding buffer.

2. The method of claim 1, wherein the remote file-system access protocol comprises Server Message Block (SMB)/Common Internet File System (CIFS).

3. The method of claim 1, wherein the single shared holding buffer is stored in a shared memory of the network device that is accessible by a plurality of processes running within the network device.

4. The method of claim 1, wherein the single shared holding buffer is stored in allocated memory of the network device that is associated with a specific process running within the network device.

5. The method of claim 1, further comprising the network device tracking usage and modification of the single shared holding buffer with a usage table.

6. The method of claim 5, wherein the usage table contains information indicative of free and filled sections of the single shared holding buffer.

7. The method of claim 6, wherein the predetermined event comprises determining the single shared holding buffer is full.

8. The method of claim 1, wherein the predetermined event comprises determining the client is attempting to append data to the file.

9. A method comprising:
creating (i) a plurality of holding buffers in which data collected from partial file accesses associated with a remote file-system access protocol is stored, (ii) a holding buffer context table, (iii) a file map table and (iv) a usage table corresponding to each holding buffer of the plurality of holding buffers within one or more computer-readable media, wherein each holding buffer corresponds to a single file, is used for both read and write accesses to the single file and is used for accesses to the single file by a plurality of remote processes by mapping different file IDs referring to the single file to the corresponding holding buffer;
tracking within the holding buffer context table references to each of the plurality of holding buffers;

mapping references to a common file to a common holding buffer of the plurality of holding buffers with the file map table;

tracking modified and unmodified portions of the plurality of holding buffers using the usage table corresponding to each holding buffer;

responsive to a predetermined event in relation to a holding buffer of the plurality of holding buffers, determining the existence or non-existence of malicious, dangerous or unauthorized content contained within the holding buffer by performing content filtering on the holding buffer.

10. The method of claim 9, wherein the one or more computer-readable media comprise non-persistent storage, such as random access memory.

11. The method of claim 9, wherein the one or more computer-readable media comprise persistent storage, such as a hard-disk, flash disk or other non-volatile storage.

12. The method of claim 10, wherein the non-persistent storage comprises shared memory that is accessible by a plurality of processes running within the network device.

13. The method of claim 9, wherein elements of the file map table contain file identifiers.

14. The method of claim 13, wherein the file identifiers consists of a number, a character string or sequence of binary digits.

15. The method of claim 9, wherein elements of the file map table contain a reference to one or more of the plurality of holding buffers.

16. The method of claim 9, wherein elements of the holding buffer context table contain a reference to one or more of the plurality of holding buffers.

17. The method of claim 9, wherein elements of the holding buffer context table contain a reference count for each holding buffer of the plurality of holding buffers.

18. The method of claim 9, wherein elements of the usage tables consist of one or more bits, bytes, numbers or strings.

19. The method of claim 18, wherein each element of the usage tables corresponds to one or more bits or bytes of the corresponding holding buffer of the plurality of holding buffers.

20. The method of claim 18, wherein the entries of the usage tables are indicative of a modified or unmodified state of corresponding portions of the corresponding holding buffers.

21. The method of claim 9, wherein the predetermined event comprises determining the holding buffer is fully modified.

22. The method of claim 9, wherein the predetermined event comprises an attempt to append data to the holding buffer.

23. A method comprising
receiving at a network device, logically interposed between a client and a server, a remote file-system access protocol request from the client, the remote file-system access protocol request representing a random or sequential access to a portion of data of a file associated with a share of the server;

the network device issuing the remote file-system access protocol request to the server on behalf of the client;

the network device implementing a holding buffer for the file during a particular remote file-system access protocol session, wherein the holding buffer is used for both read and write accesses to the file and is shared by a plurality of processes running on the client and accessing the file by mapping different file IDs referring to the file to the holding buffer;

the network device buffering into the holding buffer the portion of data being read from or written to the file responsive to the remote file-system access protocol request; and responsive to a predetermined event in relation to the remote file-system access protocol or the holding buffer, the network device determining the existence or non-existence of malicious, dangerous or unauthorized content contained within the holding buffer by performing content filtering on the holding buffer.

24. The method of claim 23, wherein the remote file-system access protocol comprises Server Message Block (SMB)/Common Internet File System (CIFS).

25. The method of claim 23, wherein the holding buffer is stored in a shared memory of the network device that is accessible by a plurality of processes running within the network device.

26. The method of claim 23, wherein the holding buffer is stored in allocated memory of the network device that is associated with a specific process running within the network device.

27. The method of claim 23, further comprising the network device tracking usage and modification of the holding buffer with a usage table.

28. The method of claim 27, wherein the usage table contains information indicative of free and filled sections of the holding buffer.

29. The method of claim 28, wherein the predetermined event comprises determining the holding buffer is full.

30. The method of claim 23, wherein the predetermined event comprises determining the client is attempting to append data to the file.

31. A non-transitory computer-readable storage medium embodying a set of instructions, which when executed by one or more processors of a network device logically interposed between a client and a server, cause the one or more processors to perform a method comprising:
receiving a remote file-system access protocol request from the client, the remote file-system access protocol request representing a request to make a partial file access to a file associated with a share of the server;

issuing the remote file-system access protocol request to the server on behalf of the client;

implementing a single shared holding buffer for the file during a particular remote file-system access protocol session, wherein the single shared holding buffer is used for both read and write accesses to the file and is used for accesses to the file by a plurality of processes running on the client by mapping different file IDs referring to the file to the single shared holding buffer;

buffering into the single shared holding buffer data being read from or written to the file as a result of the remote file-system access protocol request; and responsive to a predetermined event in relation to the remote file-system access protocol or the holding buffer, determining the existence or non-existence of malicious, dangerous or unauthorized content contained within the holding buffer by performing content filtering on the holding buffer.

32. The computer-readable storage medium of claim 31, wherein the remote file-system access protocol comprises Server Message Block (SMB)/Common Internet File System (CIFS).

33. The computer-readable storage medium of claim 31, wherein the single shared holding buffer is stored in a shared memory of the network device that is accessible by a plurality of processes running within the network device.

34. The computer-readable storage medium of claim 31, wherein the single shared holding buffer is stored in allocated memory of the network device that is associated with a specific process running within the network device.

35. The computer-readable storage medium of claim 31, wherein the method further comprises tracking usage and modification of the single shared holding buffer with a usage table.

36. The computer-readable storage medium of claim 35, wherein the usage table contains information indicative of free and filled sections of the single shared holding buffer.

37. The computer-readable storage medium of claim 36, wherein the predetermined event comprises determining the single shared holding buffer is full.

38. The computer-readable storage medium of claim 31, wherein the predetermined event comprises determining the client is attempting to append data to the file.

39. A network device comprising:
one or more non-transitory storage devices having embodied therein one or more routines; and
one or more processors coupled to the non-transitory storage device and operable to execute the one or more routines to perform a method comprising:
creating (i) a plurality of holding buffers in which data collected from partial file accesses associated with a remote file-system access protocol is stored, (ii) a holding buffer context table, (iii) a file map table and (iv) a usage table corresponding to each holding buffer of the plurality of holding buffers within the one or more non-transitory storage devices, wherein each holding buffer corresponds to a single file, is used for both read and write accesses to the single file and is used for accesses to the single file by a plurality of remote processes by mapping different file IDs referring to the single file to the corresponding holding buffer;
tracking within the holding buffer context table references to each of the plurality of holding buffers;
mapping references to a common file to a common holding buffer of the plurality of holding buffers with the file map table;
tracking modified and unmodified portions of the plurality of holding buffers using the usage table corresponding to each holding buffer;
responsive to a predetermined event in relation to a holding buffer of the plurality of holding buffers, determining the existence or non-existence of malicious, dangerous or unauthorized content contained within the holding buffer by performing content filtering on the holding buffer.

40. The network device of claim 39, wherein the one or more non-transitory storage devices comprise non-persistent storage, such as random access memory.

41. The network device of claim 39, wherein the one or more non-transitory storage devices comprise persistent storage, such as a hard-disk, flash disk or other non-volatile storage.

42. The network device of claim 40, wherein the non-persistent storage comprises shared memory that is accessible by a plurality of processes running within the network device.

43. The network device of claim 39, wherein elements of the file map table contain file identifiers.

44. The network device of claim 43, wherein the file identifiers consists of a number, a character string or sequence of binary digits.

45. The network device of claim 39, wherein elements of the file map table contain a reference to one or more of the plurality of holding buffers.

46. The network device of claim 39, wherein elements of the holding buffer context table contain a reference to one or more of the plurality of holding buffers.

47. The network device of claim 39, wherein elements of the holding buffer context table contain a reference count for each holding buffer of the plurality of holding buffers.

48. The network device of claim 39, wherein elements of the usage tables consist of one or more bits, bytes, numbers or strings.

49. The network device of claim 48, wherein each element of the usage tables corresponds to one or more bits or bytes of the corresponding holding buffer of the plurality of holding buffers.

50. The network device of claim 48, wherein the entries of the usage tables are indicative of a modified or unmodified state of corresponding portions of the corresponding holding buffers.

51. The network device of claim 39, wherein the predetermined event comprises determining the holding buffer is fully modified.

52. The network device of claim 39, wherein the predetermined event comprises an attempt to append data to the holding buffer.

* * * * *